United States Patent
Sugio (10) Patent No.: US 9,664,080 B2
(45) Date of Patent: May 30, 2017

(54) OIL SEPARATOR

(71) Applicant: NABTESCO AUTOMOTIVE CORPORATION, Tokyo (JP)

(72) Inventor: Takuya Sugio, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 98 days.

(21) Appl. No.: 14/399,156

(22) PCT Filed: May 9, 2013

(86) PCT No.: PCT/JP2013/063027
§ 371 (c)(1),
(2) Date: Nov. 5, 2014

(87) PCT Pub. No.: WO2013/168757
PCT Pub. Date: Nov. 14, 2013

(65) Prior Publication Data
US 2015/0152763 A1    Jun. 4, 2015

(30) Foreign Application Priority Data
May 9, 2012 (JP) ................. 2012-107920

(51) Int. Cl.
*F01M 13/00* (2006.01)
*F01M 13/04* (2006.01)
(Continued)

(52) U.S. Cl.
CPC ............ *F01N 3/037* (2013.01); *B01D 45/08* (2013.01); *B01D 46/0031* (2013.01);
(Continued)

(58) Field of Classification Search
CPC ...... F01M 13/00; F01M 13/04; F01M 13/028; F01M 13/02; F01M 13/0405; F01P 3/02;
(Continued)

(56) References Cited

U.S. PATENT DOCUMENTS 1,542,912 A    6/1925  Rockwell
2,771,065 A *  11/1956 Malcolm .............. F01M 13/028
                                                              123/41.86
(Continued)

FOREIGN PATENT DOCUMENTS

CN    201351587 Y    11/2009
DE      3731250 C1   10/1988
(Continued)

OTHER PUBLICATIONS

The European Search Report of EP 13787791.6 dated May 19, 2016.
The Chinese Office Action of CN 201380024012.1 dated Apr. 25, 2016.

*Primary Examiner* — Jacob T Minskey
*Assistant Examiner* — Minh-Chau Pham
(74) *Attorney, Agent, or Firm* — Christensen, Fonder, Dardi & Herbert PLLC (57) ABSTRACT

An oil separator is provided that makes it possible to minimize the number of times of operation for recovering separated oil. The oil separator separates and recovers oil by causing air that contains oil and has been introduced into a casing to strike an impingement member. The oil separator supplies the oil that has been separated from the air to the oil pan of an engine, thereby allowing the oil to be used as lubricant for the engine.

14 Claims, 7 Drawing Sheets

(51) Int. Cl.
*F01M 13/02* (2006.01)
*F01P 3/02* (2006.01)
*F02B 75/00* (2006.01)
*F02B 75/18* (2006.01)
*F02B 75/22* (2006.01)
*F04B 49/06* (2006.01)
*F01N 3/037* (2006.01)
*B01D 45/08* (2006.01)
*F04B 39/04* (2006.01)
*B01D 46/00* (2006.01)
*F01M 11/06* (2006.01)

(52) U.S. Cl.
CPC ............. *F01M 13/04* (2013.01); *F04B 39/04* (2013.01); *F01M 11/061* (2013.01); *F01M 2013/0433* (2013.01); *F01M 2013/0488* (2013.01)

(58) Field of Classification Search
CPC .......... F02B 75/00; F02B 75/18; F02B 75/22; F04B 49/06
USPC ................. 55/385.3; 123/41.86, 198 E, 573; 417/32
See application file for complete search history.

(56) References Cited

U.S. PATENT DOCUMENTS

| | | | | |
|---|---|---|---|---|
| 2,782,775 | A | * | 2/1957 | Leach ................... F01M 13/02 123/41.86 |
| 2,821,174 | A | * | 1/1958 | Scheiterlein ....... F01M 13/0405 123/41.86 |
| 4,790,287 | A | * | 12/1988 | Sakurai .................. F01M 13/04 123/41.86 |
| 4,945,887 | A | * | 8/1990 | Sakurai .................. F01M 13/04 123/41.86 |
| 2010/0006075 | A1 | | 1/2010 | Ruppel et al. |
| 2012/0055151 | A1 | | 3/2012 | Durand et al. |
| 2012/0063920 | A1 | * | 3/2012 | Ikeda ................. F16H 61/0021 417/32 |

FOREIGN PATENT DOCUMENTS

| | | |
|---|---|---|
| DE | 10252474 A1 | 6/2004 |
| DE | 102006041213 A1 | 3/2008 |
| JP | S53-15507 U | 2/1978 |
| JP | 56-111212 U | 8/1981 |
| JP | 63-157234 U | 10/1988 |
| JP | 03-100323 A | 4/1991 |
| JP | 5-69305 U | 9/1993 |
| JP | 06-18572 Y2 | 5/1994 |
| JP | H07-10478 U | 2/1995 |
| JP | 10-296038 A | 11/1998 |
| JP | 2003-278522 A | 10/2003 |
| JP | 2008-002377 A | 1/2008 |

* cited by examiner

| | First Electromagnetic Valve 95 | Second Electromagnetic Valve 96 |
|---|---|---|
| During intake | open | closed |
| During separation process | closed | closed |
| During delivery | closed | open |

| | Third Electromagnetic Valve 97 | Fourth Electromagnetic Valve 98 |
|---|---|---|
| During intake | open | closed |
| During separation process | closed | closed |
| During delivery | closed | open |

OIL SEPARATOR

RELATED APPLICATIONS

The present is a National Phase entry of PCT Application No. PCT/JP2013/063027, filed May 9, 2013, which claims priority from Japanese Patent Application No. 2012-107920, filed May 9, 2012, the disclosures of which are hereby incorporated by reference herein in their entirety.

FIELD OF THE INVENTION

The present invention relates to an oil separator that separates oil contained in air that has passed through equipment.

BACKGROUND OF THE INVENTION

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the interior of the compressor. When the compressed air containing such water and oil enters inside the systems, it causes rust and swelling of rubber members (such as O-rings) and results in an operational defect. Thus, an air dryer is provided downstream of the compressor in an air system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water absorbed by the desiccant and discharging it to the outside.

The air discharged from the air dryer during regeneration of the desiccant contains oil together with water. Considering the burden on the environment, an oil separator may be provided downstream of the compressor in the air system.

An impingement plate-type oil separator performs gas/liquid separation by allowing air that contains water and oil to strike an impingement plate provided in the housing to recover the oil from the air and discharge cleaned air (for example, Patent Document 2).

PRIOR ART DOCUMENTS

Patent Documents

Patent Document 1: Japanese Laid-Open Patent Publication No. 10-296038
Patent Document 2: Japanese Laid-Open Patent Publication No. 2008-2377

SUMMARY OF THE INVENTION

Problems that the Invention is to Solve

The above described oil separators are used in a cylinder head to return the separated oil from the bottom of the oil separator to the cylinder head. However, if the oil separator is located downstream of the compressor in the air system, the oil separated from air is stored in the housing of the oil separator. When the amount of the stored oil reaches the capacity of the oil separator, the oil needs to be removed from the separator and recovered. However, the number of times of maintenance operation, which include recovery of separated oil, is desired to be small. Thus, an oil separator has been desired that reduces the number of times of the operation for recovering separated oil.

Accordingly, it is an objective of the present invention to provide an oil separator that reduces the number of times of the operation for recovering separated oil.

Means for Solving the Problems

Means for achieving the above objectives and advantages thereof will now be discussed.

To achieve the foregoing objective, an oil separator that includes a housing and an impingement member located in the housing is provided. The oil separator introduces air containing oil into the housing and causes the air to strike the impingement member to separate oil from the introduced air, thereby recovering the oil. The oil separated from the air is supplied to an oil pan of an engine to be used as lubricant for the engine.

With this configuration, the oil separated by the oil separator is supplied to the engine oil pan. This reduces the oil stored in the oil separator, resulting in a limited number of times of operation for recovering the separated oil.

In accordance with a configuration of the above described oil separator, the oil pan is located on a circulation path of the lubricant for the engine, and the separated oil is supplied to the oil pan via the circulation path.

With this configuration, the separated oil is supplied to the circulation path. Thus, oil is supplied not only to the oil pan, but also to devices on the circulation path. The oil storage capacity is greater than that in a case in which oil is stored only in the oil pan.

In accordance with a configuration of the above described oil separator, the oil separator further includes a pump that supplies the separated oil to the oil pan.

With this configuration, the separated oil is supplied to the oil pan using a pump. Thus, the oil is reliably supplied to the oil pan from the oil separator.

In accordance with a configuration of the above described oil separator, the separated oil is supplied to the oil pan when the engine is in a stopped state.

With this configuration, the oil separated by the oil separator is supplied to the oil pan when the engine is in a stopped state. Thus, oil is supplied in a state in which the amount of oil is not changed by the operation of the engine. This prevents the permissible amount from being surpassed by an unnecessarily large amount of oil supply.

In accordance with a configuration of the above described oil separator, the separated oil is supplied to the oil pan when the amount of the separated oil reaches a specific amount.

With this configuration, oil is supplied to the oil pan when the amount of oil separated by the oil separator reaches the specific amount. Thus, oil is supplied to the oil pan only when the separated oil needs to be reduced. This improves the efficiency of the oil supply.

In accordance with a configuration of the above described oil separator, the supply of the separated oil to the oil pan is stopped when the amount of the lubricant in the oil pan reaches a permissible amount.

With this configuration, when the lubricant in the oil pan reaches the permissible amount, the supply of the oil to the oil pan is stopped. Thus, the lubricant in the oil pan is prevented from overflowing with the supply of the separated oil.

Effects of the Invention

The present invention reduces the number of times of operation for recovering collected liquid in an oil separator.

DETAILED DESCRIPTION OF THE PREFERRED EMBODIMENTS

An oil separator according to one embodiment will now be described with reference to FIGS. 1 to 3. The oil separator is applied to an exhaust system of an air dryer.

Figure 1:
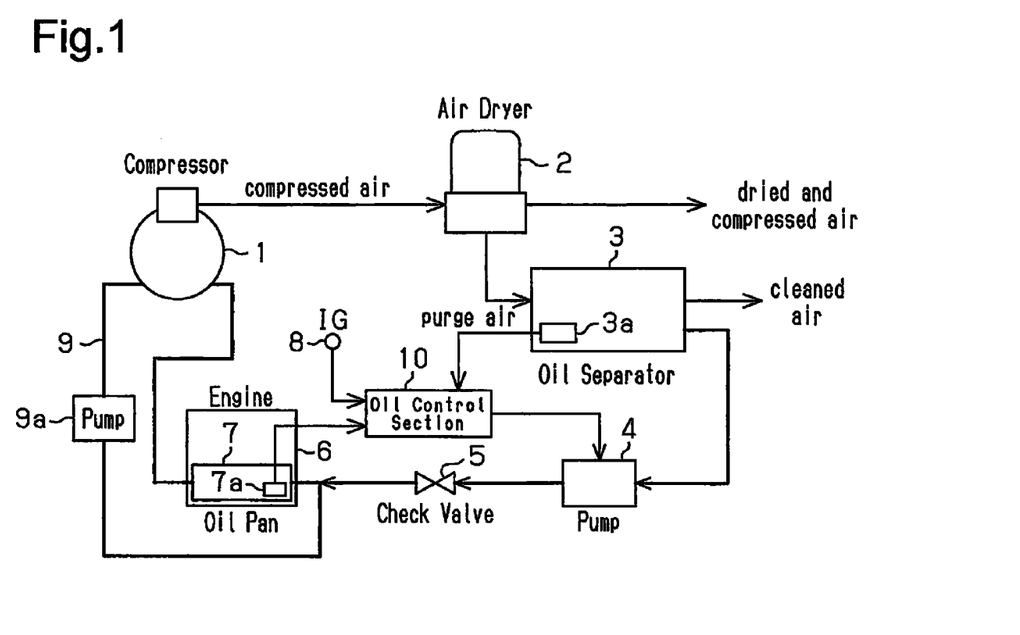
FIG. 1 is a block diagram illustrating the installation position of an oil separator in an air system and a path of lubricant according to one embodiment.

As shown in FIG. 1, vehicles such as trucks, buses, and construction machines utilize compressed air sent from a compressor 1 to control systems such as brakes and suspensions. Thus, an air dryer 2, which removes oil and water in the compressed air and provides dried air, is located downstream of the compressor 1 of an air system. A desiccant is provided in the air dryer 2. The air dryer 2 performs dehumidification to remove oil and water from the compressed air, and regeneration to regenerate the desiccant by removing the oil and water absorbed by the desiccant and discharging them to the outside.

In the present embodiment, since air (purge air) discharged from the air dryer 2 during regeneration of the desiccant includes oil together with water, an oil separator 3 is provided downstream of the compressor 1 of the air system considering the burden on the environment. In particular, the oil separator 3 is provided in an exhaust system of the air dryer 2, and separates and recovers the oil and water from purge air discharged during regeneration of the desiccant in the air dryer 2.

The oil separator 3 is an impingement plate-type oil separator and includes, inside the housing, impingement members, against which air containing oil and water strikes. The impingement plate-type oil separator 3 performs gas/liquid separation by allowing air containing oil and water to strike the impingement members. In this manner, the oil separator 3 recovers oil from air, and discharges cleaned air. The liquid that has been separated from air contains oil and water. Such liquid will hereafter be referred to as collected liquid in some cases.

An engine 6 has an oil pan 7 for storing lubricant. The lubricant stored in the oil pan 7 is circulated within the engine 6 and also circulated through a circulation path 9, which connects the compressor 1 and the oil pan 7 to each other. The lubricant in the circulation path 9 is circulated by a pump 9a.

A drain outlet 17 of the oil separator 3 is connected to the circulation path 9 via a pump 4 and a check valve 5. That is, liquid that is stored in the oil separator 3 and contains high concentration of oil is drawn by the pump 4 and delivered to the oil pan 7. The check valve 5 prevents oil from flowing back from the oil pan 7 to the oil separator 3.

The oil separator 3 includes an oil measuring instrument 3a, which measures the amount of oil in the oil separator 3. Likewise, the oil pan 7 includes an oil measuring instrument 7a, which measures the amount of oil in the oil pan 7. The oil measuring instruments 3a, 7a are, for example, mechanical measuring instruments that measure the amount of liquid in accordance with the position of a float. The oil measuring instruments 3a, 7a and the pump 4 are connected to an oil control section 10.

The oil control section 10 controls the operation of the pump 4, thereby delivering oil from the oil separator 3 to the circulation path 9. The oil is supplied to the oil pan 7 via the circulation path 9. The oil control section 10 may be mounted in the oil separator 3 or the pump 4, or incorporated in another control device. The oil control section 10 is also connected to an ignition (IG) switch 8. The oil control section 10 detects whether the engine 6 is running based on information from the IG switch 8. The oil control section 10 determines whether the amount of oil has reached a specific value, or a specific amount, according to the oil measuring instrument 3a of the oil separator 3. The oil control section 10 determines whether the amount of oil has reached an upper limit value, which is a permissible amount, according to the oil measuring instrument 7a of the oil pan 7.

The oil control section 10 delivers the oil that has been separated by the oil separator 3 to the oil pan 7 using the pump 4 when all the following delivering conditions are met.

(a) The amount of oil in the oil separator 3 is greater than or equal to the specific value.

(b) The amount of oil in the oil pan 7 is less than the upper limit value.

(c) The engine is in a stopped state (not running).

Figure 2:
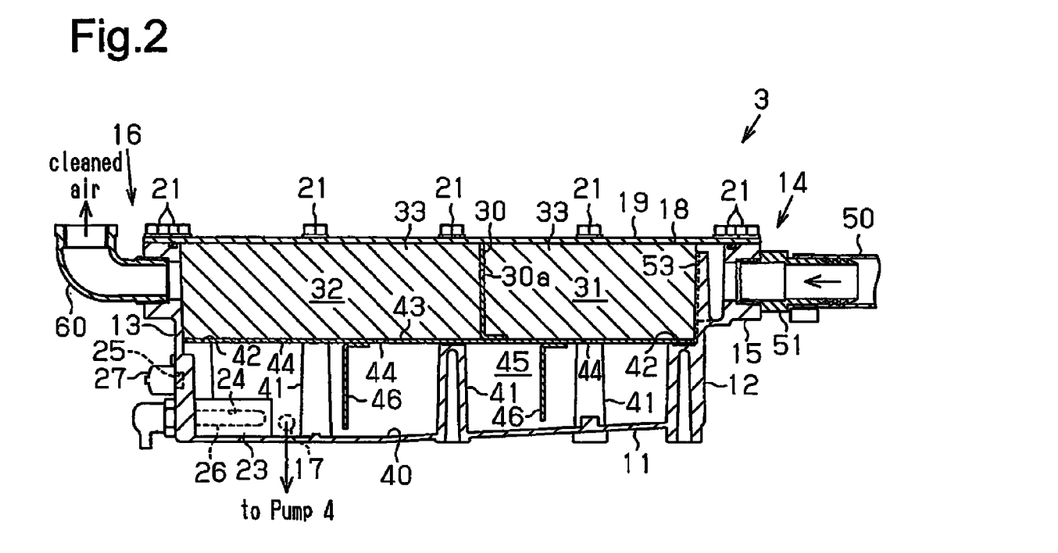
FIG. 2 is a vertical cross-sectional view illustrating the internal structure of the oil separator of FIG. 1.

As shown in FIG. 2, the oil separator 3 includes a rectangular parallelepiped housing 11, which extends in the horizontal direction. The housing 11 has a front face 12 and a rear face 13, which are opposed to each other in the longitudinal direction. An inlet 14 and an outlet 16 are respectively formed in the front face 12 and the rear face 13. That is, air passes through the oil separator 3 from right to left in FIG. 2.

Support members (support columns 41, steps 42), which support a liquid communication plate 43, are provided on a bottom face 40 of the housing 11. The liquid communication plate 43 is mounted on the support columns 41 and the steps 42 in a bridging manner in the housing 11. The section in the housing 11 above the liquid communication plate 43 functions as an expansion chamber, which permits air introduced through the inlet 14 to pass through. The section in the housing 11 below the liquid communication plate 43 functions as a collected liquid storage portion 45, which stores oil and water (collected liquid) separated from the air in the expansion chamber. The collected liquid storage portion 45 is capable of storing the collected liquid to the lower surface of the liquid communication plate 43.

A plate-like partition wall 30 is mounted on the upper surface of the liquid communication plate 43 in the middle between the inlet 14 and the outlet 16. An orifice hole 30a is formed at the upper section of the partition wall 30. The partition wall 30 functions as an orifice with the orifice hole 30a. The partition wall 30 divides the section in the housing 11 above the liquid communication plate 43 into a primary expansion chamber 31 close to the inlet 14 and a secondary expansion chamber 32 close to the outlet 16 in the horizontal direction. A urethane foam block (such as a sponge block) 33 is arranged in each of the primary expansion chamber 31 and the secondary expansion chamber 32. The air introduced through the inlet 14 strikes the urethane foam blocks 33, which separates oil and water from the air. That is, the urethane foam blocks 33 trap oil and water contained in the air. The urethane foam blocks 33 correspond to the impingement members.

The liquid communication plate 43 has liquid communication holes 44, which allow the oil and water separated in the primary expansion chamber 31 and the secondary expansion chamber 32 to pass through to the collected liquid storage portion 45. At least one of the liquid communication holes 44 is formed corresponding to each of the expansion chambers 31, 32. The oil and water separated from the air by striking the urethane foam blocks 33 flows along the upper surface of the liquid communication plate 43 and drops through any of the liquid communication holes 44 into the collected liquid storage portion 45.

Two baffle plates 46, which restrict the flow of the collected liquid stored in the collected liquid storage portion 45, are mounted on the lower surface of the liquid communication plate 43. The baffle plates 46 extend in the widthwise direction. The baffle plates 46 restrict the collected liquid stored in the collected liquid storage portion 45 from moving due to changes in the vehicle acceleration, thus suppressing splashing of the collected liquid.

Furthermore, an opening portion 18 is formed in the upper surface of the housing 11. The opening portion 18 is closed by a rectangular lid 19. The lid 19 and the housing 11 are tightly secured to each other with bolts 21 and nuts. The lid 19 restricts movement of, for example, the urethane foam blocks 33 accommodated in the housing 11.

An accommodation portion 23 for accommodating a heating means, which is a heater 26 in the present embodiment, is provided on a part of the bottom face 40 in the housing 11 close to the outlet 16. In the accommodation portion 23, an insertion section 24 for inserting the heater 26 opens in the rear face 13 of the housing 11. The heater 26 is columnar and is inserted in the accommodation portion 23 from the rear face 13. The heater 26 is connected to a power supply.

A mounting hole 25 for mounting a thermostat 27 is formed in the rear face 13 of the housing 11 above the insertion section 24. The thermostat 27 is mounted on the mounting hole 25 and is connected to the power supply and the heater 26. The thermostat 27 detects the temperature of the collected liquid storage portion 45 and controls heating performance of the heater 26 based on the detected temperature. The water contained in the collected liquid that is stored at the bottom face of the collected liquid storage portion 45 is evaporated as much as possible by heating the collected liquid storage portion 45 with the heaters 26 so that liquid containing high concentration of oil is generated.

An introduction portion 15 is formed in an upper section of the front face 12 of the housing 11. The passage cross-sectional area of the introduction portion 15 is smaller than that of the housing 11. The inlet 14 is formed in the introduction portion 15. A cylindrical mounting member 51 is secured to the distal end of the inlet 14. The distal end of a hose 50, which is connected to the air dryer 2, is connected to the distal end of the mounting member 51. A restricting plate 53, which restricts reverse flow of the collected liquid from the inside of the housing 11 to the inlet 14, is provided in front of the introduction portion 15.

An L-shaped elbow member 60 is mounted to the outlet 16. The elbow member 60 extends in the horizontal direction from the outlet 16 and bends upward. The basal end of the elbow member 60 is screwed to the outlet 16.

Operation of the oil separator 3 configured as described above will now be described.

Purge air discharged from the air dryer 2 is introduced to the oil separator 3. The purge air contains oil and water.

The air introduced into the primary expansion chamber 31 through the inlet 14 flows through the associated urethane foam block 33 while oil and water are trapped by the urethane foam block 33. At this time, oil and water that has struck the urethane foam block 33 is separated from the air. The liquid containing the water and oil trapped by the urethane foam block 33 moves in the urethane foam block 33, reaches the upper surface of the liquid communication plate 43, drops through the liquid communication holes 44 formed in the liquid communication plate 43 into the collected liquid storage portion 45, and is stored in the collected liquid storage portion 45.

The air that has passed through the urethane foam block 33 in the primary expansion chamber 31 flows toward the orifice hole 30a of the partition wall 30, and passes through the orifice hole 30a. At this time, the oil and the water that has struck parts of the partition wall 30 other than the orifice hole 30a is separated from the air. The liquid that has struck the partition wall 30 and has been separated from the air moves along the partition wall 30, reaches the upper surface of the liquid communication plate 43, drops through the liquid communication holes 44 formed in the liquid communication plate 43 into the collected liquid storage portion 45, and is stored in the collected liquid storage portion 45.

The air that has passed through the orifice hole 30a of the partition wall 30 passes through the urethane foam block 33 in the secondary expansion chamber 32, while being deprived of oil and water by the associated urethane foam block 33. At this time, the oil and water that has struck the urethane foam block 33 is separated from the air. The liquid containing the water and oil trapped by the urethane foam block 33 moves in the urethane foam block 33, reaches the upper surface of the liquid communication plate 43, drops through the liquid communication holes 44 formed in the liquid communication plate 43 into the collected liquid storage portion 45, and is stored in the collected liquid storage portion 45.

The air that has passed through the urethane foam block 33 of the secondary expansion chamber 32 becomes cleaned air containing no oil and is discharged to the outside through the outlet 16.

The collected liquid stored in the collected liquid storage portion 45 is heated by the heater 26. This evaporates the water in the collected liquid. The collected liquid containing high concentration of oil is stored in the collected liquid storage portion 45. The oil control section 10 obtains the amount of oil in the oil separator 3 from the oil measuring instrument 3a in the oil separator 3 and the amount of oil in the oil pan 7 from the oil measuring instrument 7a in the oil pan 7. The oil control section 10 obtains information regarding whether the engine is running from the IG switch 8.

Figure 3:
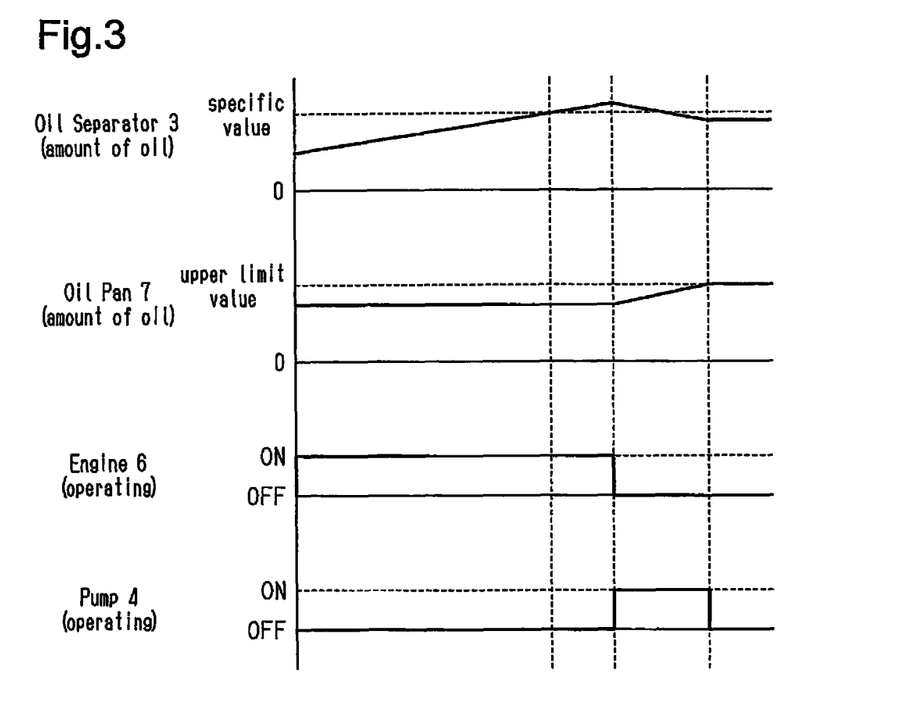
FIG. 3 is a sequence chart showing the conditions for delivering oil.

For example, when the engine 6 is operating (ON state), the amount of oil in the oil separator 3 increases as shown in FIG. 3. When the oil amount in the oil separator 3 reaches the specific value, the oil control section 10 determines that the delivering condition (a) is met. On the other hand, since the engine is 6 is running (ON state), the oil control section 10 determines that the delivering condition (c) is not met. The oil control section 10 thus does not activate the pump 4 (OFF state). At this time, if the oil amount in the oil pan 7 is less than the upper limit value, the oil control section 10 determines that the delivering condition (b) is met.

Thereafter, when the engine 6 is stopped (OFF state), the oil control section 10 determines that the delivering condition (c) is met. Since the delivering conditions (a), (b), (c) are all met, the oil control section 10 activates the pump 4 (ON state). When the pump 4 is activated, the oil in the oil separator 3 is supplied to the oil pan 7 via the circulation path 9. This reduces the oil amount in the oil separator 3, while increasing the oil amount in the oil pan 7. When the oil amount in the oil pan 7 reaches the upper limit value, the oil control section 10 determines that the delivering condition (b) is no longer met. The oil control section 10 thus stops activating the pump 4.

In this manner, the oil separated by the oil separator 3 is supplied to the oil pan 7 via the circulation path 9 so that the oil in the oil separator 3 is reduced. This reduces the number of times of operation for recovering the oil or the collected liquid in the oil separator 3.

The above-described embodiment achieves the following advantages.

(1) Since oil is supplied from the oil separator 3 to the oil pan 7 of the engine 6, the oil in the oil separator 3 is reduced. This reduces the number of times of operation for recovering oil.

(2) Since oil is supplied from the oil separator 3 to the circulation path 9, which circulates lubricant, the supplied oil is delivered to the compressor 1 and the engine 6, which are located on the circulation path 9. The oil storage capacity is greater than that in a case in which oil is stored only in the oil pan 7.

(3) Since the pump 4 is used to supply oil from the oil separator 3 to the oil pan 7, the oil is reliably supplied from the oil separator 3 to the oil pan 7.

(4) Oil is supplied to the oil pan 7 when the engine 6 is in a stopped state. In other words, the oil supply is performed in a state in which the amount of oil is not changed by operation of the engine 6. This prevents the oil amount in the oil pan 7 from surpassing the permissible amount due to an unnecessarily great amount of oil supply.

(5) When the oil amount reaches the specific value, the oil is supplied to the oil pan 7 from the oil separator 3. Therefore, oil is supplied to the oil pan 7 only when the amount of oil needs to be reduced. The oil supply is therefore performed efficiently.

(6) When the lubricant in the oil pan 7 reaches the upper limit value, the supply of oil to the oil pan 7 from the oil separator 3 is stopped. Thus, the lubricant in the oil pan 7 is prevented from overflowing due to supply of the oil.

The above described embodiment may be modified as follows.

In the above illustrated embodiment, the lid 19 restricts the movement of the urethane foam blocks 33. However, as long as the urethane foam blocks 33 are secured, the movement does not necessarily have to be restricted by the lid 19.

In the above illustrated embodiment, the urethane foam blocks 33 are provided in the primary expansion chamber 31 and the secondary expansion chamber 32. However, the urethane foam blocks 33 may be changed or partially omitted in accordance with the amount of oil and water discharged from the air dryer 2 (the compressor 1).

In the illustrated embodiment, the box-shaped oil separator 3 is employed. However, a cylindrical oil separator 3 may be employed. For example, in each of the modifications illustrated in FIGS. 5 and 6, the oil separator 3 includes a case 131, which is a cylindrical housing having a closed end and extending in the vertical direction, and a lid 132, which closes the opening of the case 131. A drain outlet 133 for draining the collected liquid that has been stored is provided at a bottom portion 131a of the case 131. A drain hose 134, which is used when removing the collected liquid, is connected to the drain outlet 133. The lid 132 has an inlet 135 for introducing purge air from the air dryer 2 through the connecting hose 125, and an outlet 140 for discharging cleaned air from which oil has been separated. The inlet 135 and the outlet 140 are formed separately. The inlet 135 and the connecting hose 125 are connected to each other by a coupling member 127. An elbow member 141 is connected to the outlet 140. The elbow member 141 extends in the horizontal direction from the outlet 140 and then bends vertically upward. A mounting member 137 is formed integrally with the lid 132 to extend upright. The inlet 135 and the outlet 140 are open in the same direction in the lid 132. The internal space of the lid 132 functions as a first expansion chamber 145, which expands the purge air introduced from the inlet 135. The lid 132 has a communication section 132a, which connects the inside of the case 131 to the outlet 140.

Figure 5:
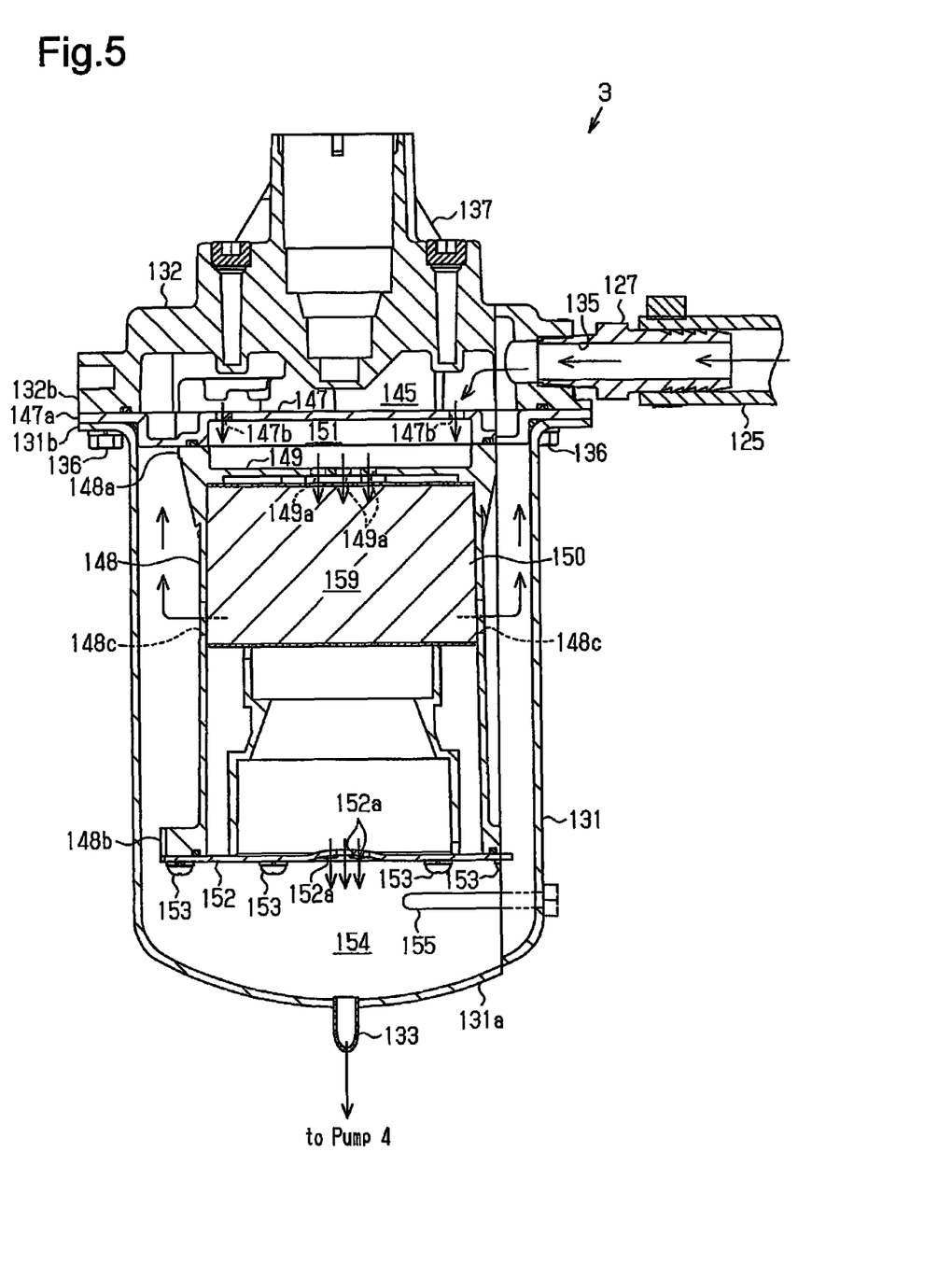
FIG. 5 is a vertical cross-sectional view illustrating the internal structure of an oil separator according to a modification.
Figure 6:
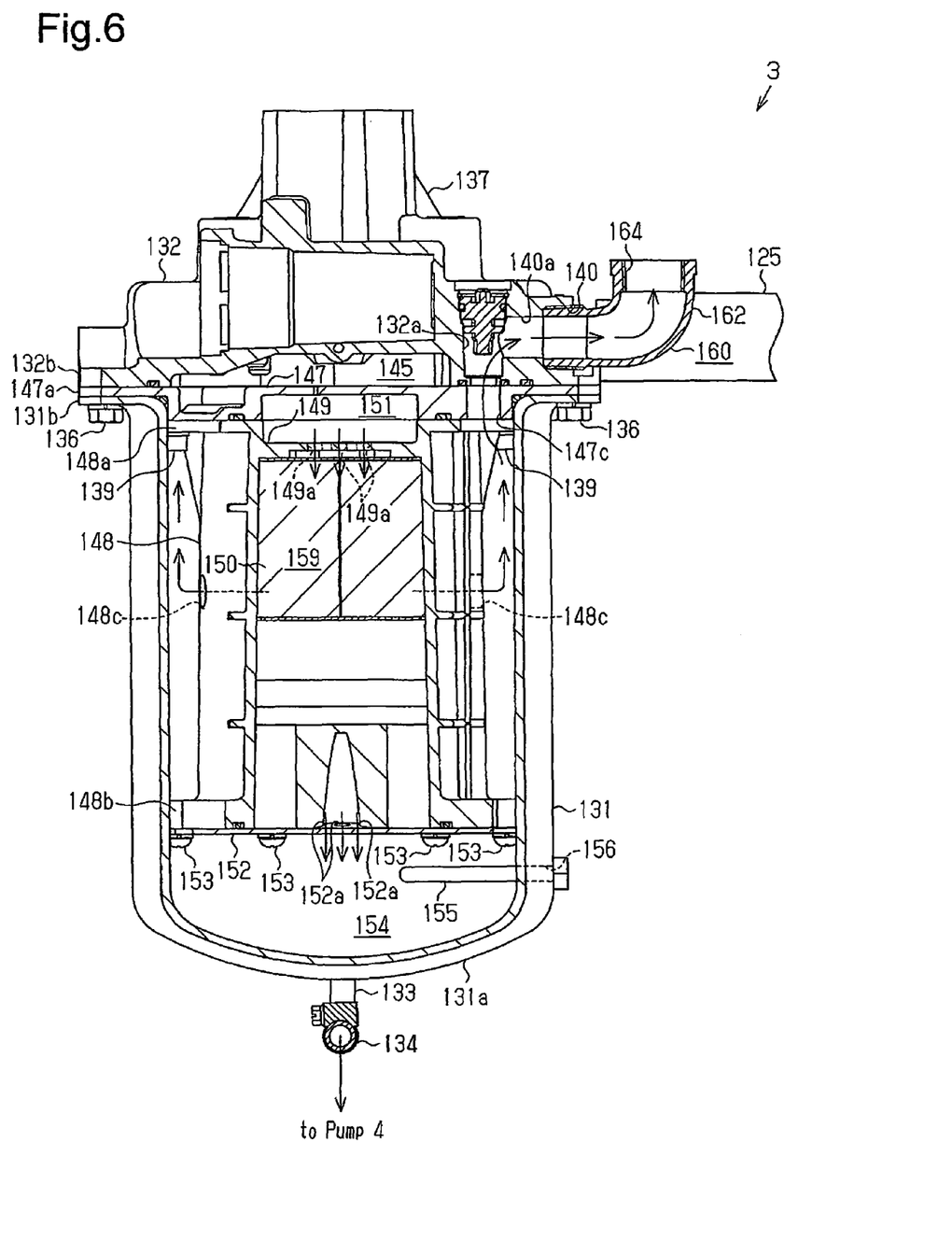
FIG. 6 is a vertical cross-sectional view illustrating the internal structure of an oil separator according to a modification.

A disk-like cover 147, which closes the case 131 and the opening portion of the lid 132, is provided between the case 131 and the lid 132. The cover 147 and the case 131 are fastened to the lid 132 with bolts 136. That is, the bolts 136 are fastened to threaded bores formed in a flange portion 132b provided on the lid 132. Furthermore, threaded portions of the bolts 136 extend through through-holes formed in a flange portion 131b provided on the case 131. The cover 147 has through-holes through which the threaded portions of the bolts 136 extend. Thus, the threaded portions of the bolts 136 are passed through the through-holes of the flange portion 131b of the case 131 and the through-holes of a flange portion 147a of the cover 147. The bolts 136 are then screwed to the threaded bores of the flange portion 132b of the lid 132 so that the lid 132, the cover 147, and the case 131 are fastened together. The cover 147 has a communication hole 47c, which connects the inside of the case 131 to the outlet 140.

The space formed by the lid 132 and the cover 147 functions as the first expansion chamber 145. A cylindrical accommodation member 148 with a vertically upper end closed is secured to the cover 147 with bolts 136. The accommodation member 148 accommodates a urethane foam block 150 such as a sponge block. The urethane foam block 150 functions as an impingement member. A flange portion 148a and a flange portion 148b are formed at an upper edge and a lower edge of the accommodation member 148. The bolts 136 extend through the flange portion 148a formed at the upper edge of the accommodation member 148 so that the accommodation member 148 is tightened to the cover 147. The space formed by the cover 147 and upper surface of the accommodation member 148 functions as a second expansion chamber 151. The cover 147 has through holes 147b, which connect the first expansion chamber 145 to the second expansion chamber 151. Through holes 149a are formed at the center portion of an upper base 149 of the accommodation member 148. The through holes 147b of the cover 147 and the through holes 149a of the upper base 149 of the accommodation member 148 are formed at positions that are not opposed to each another. The accommodation member 148 has through holes 148c formed at the lower end of the side face at intervals in the radial direction.

A disk-like support lid 152 is secured to the flange portion 148b, which is formed at the lower edge of the accommodation member 148, with screws 153. The support lid 152 supports the accommodated urethane foam block 150. The inner diameter of the support lid 152 is substantially the same as the inner diameter of the case 131. The space formed by the upper base 149 of the accommodation member 148 and the support lid 152 functions as a third expansion chamber 159. The support lid 152 has through holes 152a, which permit the oil and water removed by the urethane foam block 150 to drop. Thus, the lower section in the case 131 functions as a collected liquid storage portion 154. A drain outlet 133 of the oil separator 3 is connected to a circulation path 9 via a pump 4 and a check valve 5.

In the above illustrated embodiment, the heater 26 heats the collected liquid storage portion 45. However, the heater 26 may directly heat the collected liquid stored in the collected liquid storage portion 45. In this case, the thermostat 27 is desirably located on the inner wall of the housing 11 to perform accurate temperature control. In this case, since heat transfer from the heater 26 to the collected liquid is increased, the collected liquid is efficiently heated as compared to the case in which the collected liquid is indirectly heated.

The number of heaters 26 may be changed as required.

The above illustrated embodiment is configured such that the oil separator 3 delivers oil to the oil pan 7 when the delivering conditions (a), (b), (c) are all met. However, the oil separator 3 may deliver oil to the oil pan 7 when at least one of the delivering conditions (a), (b), (c) is met.

In the above illustrated embodiment, an oil-water separation filter may be provided in the collected liquid storage portion 45. In this case, the liquid stored in the collected liquid storage portion 45 is caused to pass through the oil-water separation filter, so that liquid containing high concentration of oil is drained from the drain outlet 17.

In the above configuration, an oil-water separator may be provided between the drain outlet 17 and the oil pan 7. This allows clean liquid containing even higher concentration of oil to be delivered to the oil pan 7.

Figure 4:
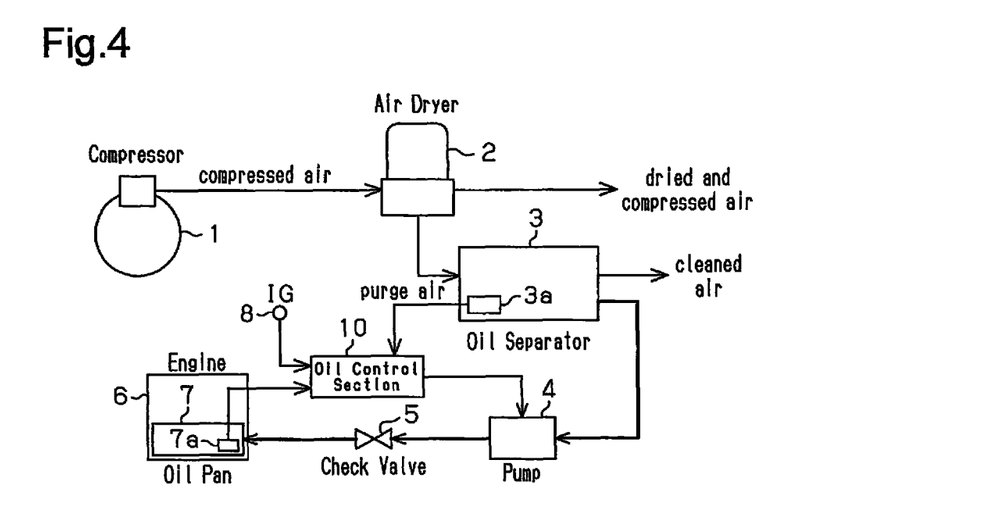
FIG. 4 is a block diagram illustrating the installation position of an oil separator in an air system and a path of lubricant.

In the above illustrated embodiment, separated oil is supplied to the circulation path 9. However, as shown in FIG. 4, separated oil may be supplied only to the oil pan 7 of the engine 6.

In the above illustrated embodiment, the pump 4 is used to supply oil from the oil separator 3 to the oil pan 7. However, oil may be supplied from the oil separator 3 to the oil pan 7 without using the pump 4. For example, in a case in which the oil separator 3 is located in a section of the air system that is downstream of the compressor 1 and upstream of the air dryer 2, as in modifications shown in FIGS. 7 and 8, the pressure generated by the compressor 1 may be used to supply oil from the oil separator 3 to the oil pan 7.

Figure 7:
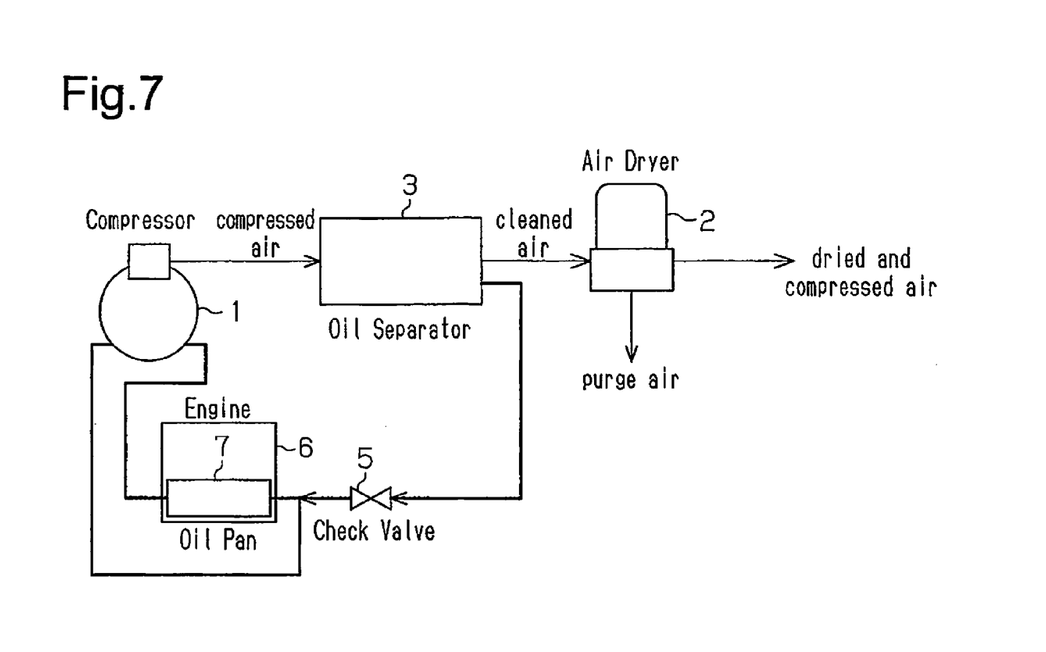
FIG. 7 is a block diagram illustrating the installation position of an oil separator in an air system and a path of lubricant according to a modification.
Figure 8:
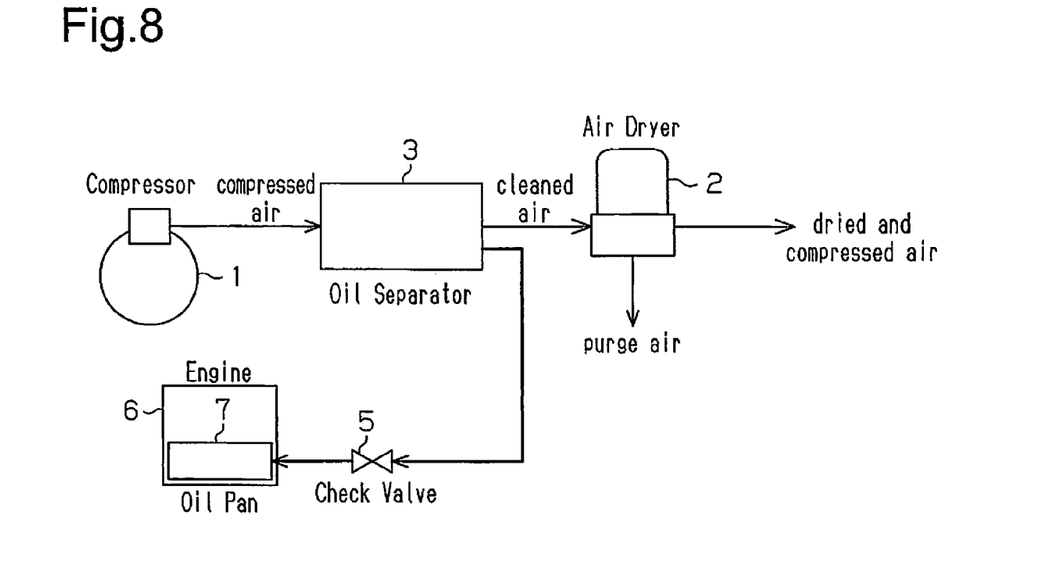
FIG. 8 is a block diagram illustrating the installation position of an oil separator in an air system and a path of lubricant according to a modification.

In the above illustrated embodiment, the oil separator 3 is provided in the exhaust system of the air dryer 2, which is downstream of the compressor 1 in the air system. However, as shown in FIGS. 7 and 8, the oil separator 3 may be located in a section of the air system that is downstream of the compressor 1 and upstream of the air dryer 2. In this case, oil is separated from air containing lubricant for the compressor 1, and cleaned air is supplied to the air dryer 2. Thus, the desiccant in the air dryer 2 is prevented from being deteriorated due to oil.

In the above illustrated embodiments, water and oil contained in the liquid stored in the collected liquid storage portions 45, 154 may be separated from each other. For example, water and oil may be separated from each other by centrifugal separation. Also, an additive agent may be added to the collected liquid to water and oil from each other. Alternatively, the internal pressure of the collected liquid storage portions 45, 154 may be maintained at a low pressure to cause water to evaporate, thereby separating water and oil from each other.

In the above illustrated embodiments, an emulsion prevention measure may be taken to prevent the liquid stored in the collected liquid storage portions 45, 154 from being emulsified. For example, catalyst may be added to suppress dispersion of water or oil. Also, the collected liquid may be electrolyzed to remove water. Alternatively, the collected liquid may be exposed to ultrasonic vibration, so that water and oil are separated from each other by the difference in specific gravity.

Figure 9:
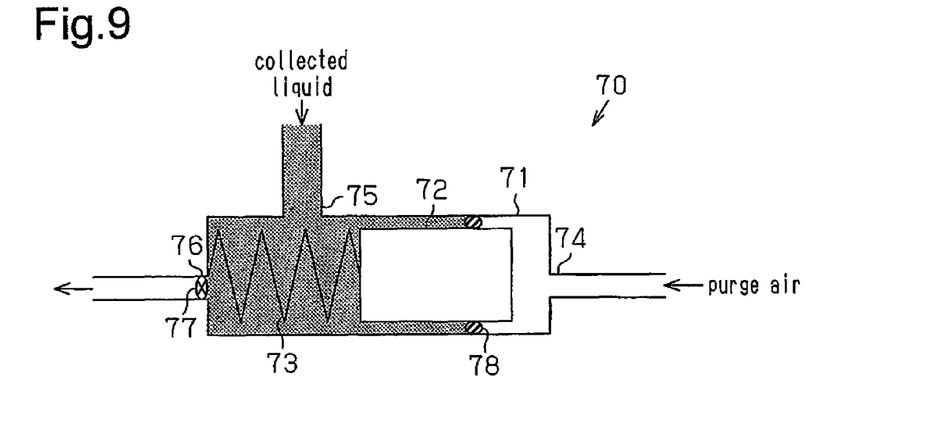
FIG. 9 is a schematic diagram showing the structure of a pneumatic pump according to a modification.
Figure 10:
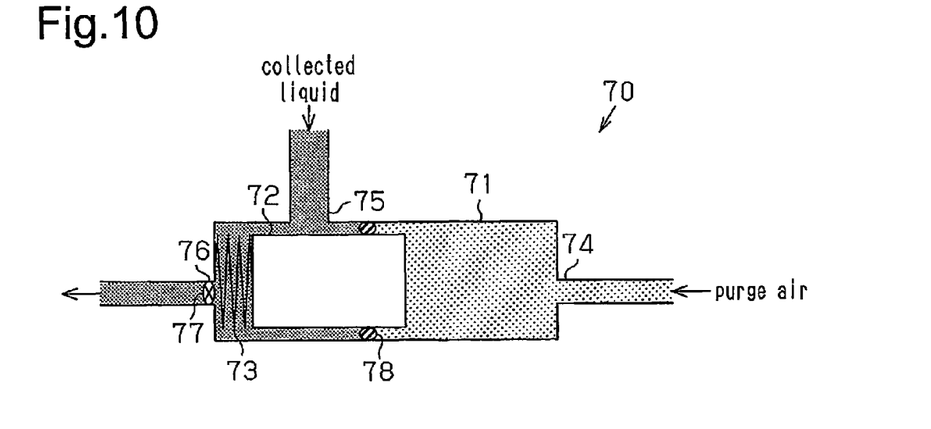
FIG. 10 is a schematic diagram showing the structure of the pneumatic pump of FIG. 9.

In the above illustrated embodiment, a pneumatic pump may be used as the pump 4, which draws collected liquid or oil from the collected liquid storage portions 45, 154. The pneumatic pump is operated by switching compressed air in a tank with an electromagnetic valve. The pneumatic pump is also operated by using purge air. FIGS. 9 and 10 show such a pneumatic pump 70, which includes a cylindrical case 71, a columnar plunger 72, which reciprocates within the case 71, and a spring 73 for urging the plunger 72. The case 71 includes a purge air supply port 74, which receives purge air from the air dryer 2, an intake port 75, which receives collected liquid from the oil separator 3, and a delivery port 76, which delivers the collected liquid from the oil separator 3. The purge air supply port 74 and the delivery port 76 are arranged on the opposite sides of the plunger 72. The intake port 75 is located on a part of the side wall of the case 71 that is closer to the delivery port 76. A check valve 77 is provided in the delivery port 76. The urging spring 73 urges the plunger 72 toward the purge air supply port 74. A sealing member 78 is attached to the side surface of the plunger 72. The sealing member 78 contacts the inner wall of the case 71. As illustrated in FIG. 9, when the supply of purge air is stopped, the urging spring 73 moves the plunger 72 to a position close to the purge air supply port 74 so that collected liquid is drawn in through the intake port 75. When purge air is supplied to the interior of the case 71 as shown in FIG. 10, the plunger 72 is moved toward the plunger 72 to deliver the liquid through the delivery port 76.

Figure 11:
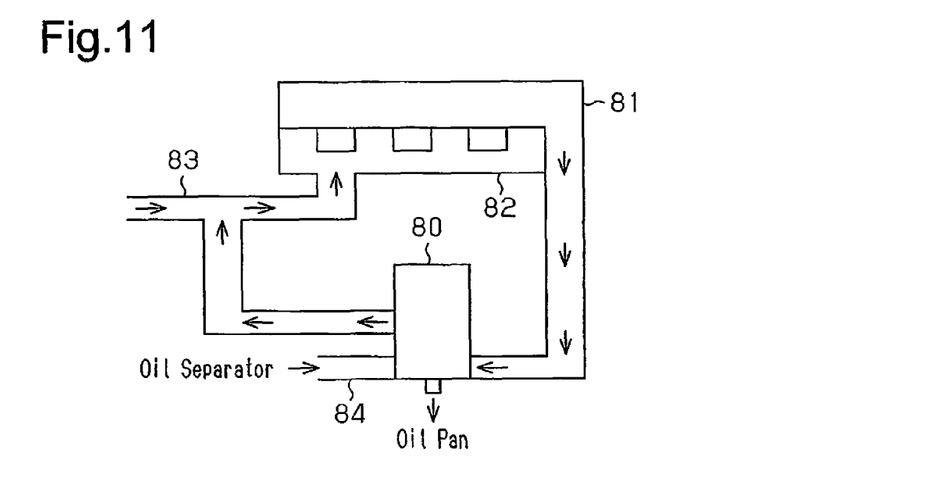
FIG. 11 is a diagram showing a blow-by gas reducing device according to a modification.

In the above illustrated embodiments, oil is supplied from the oil separator 3 to the oil pan 7. However, oil may be supplied to a blow-by gas reducing device and then returned to the oil pan 7. As shown in FIG. 11, a blow-by gas reducing device 80 takes in blow-by gas from an engine rocker cover 81, separates oil from the blow-by gas, and returns the separated oil to the oil pan. The blow-by gas reducing device 80 also returns the blow-by gas from which the oil has been separated to an air duct 83, which supplies air to an intake manifold 82. A connecting pipe 84 for delivering the oil separated by the oil separator 3 is connected to the blow-by gas reducing device 80 to supply oil to the blow-by gas reducing device 80.

In the above illustrated embodiments, the supply of oil from the oil separator 3 may be performed by negative pressure generated by a vacuum pump regardless whether the engine is running. Alternatively, the negative pressure generated when the engine is running may be used.

In the above illustrated embodiment, the drain outlets 17, 133 for draining liquid stored in the collected liquid storage portions 45, 154 are located at the lower part of the housings (cases) 11, 131. However, drain outlets may be provided in an upper portion of the housings (cases) 11, 131 that is close to the surface of the collected liquid. Since a large amount of oil exists in a region close to the surface of the collected liquid, it is possible to take out liquid containing a large amount of oil. This allows a great amount of oil to be recovered. Further, oil outlets may be provided in an upper portion of the housings (cases) 11, 131 that is close to the surface of the collected liquid, and water outlets may be provided in a lower portion of the housings (cases) 11, 131. This structure allows liquid containing a large amount of oil and liquid containing large amount of water to be readily recovered.

Figure 12:
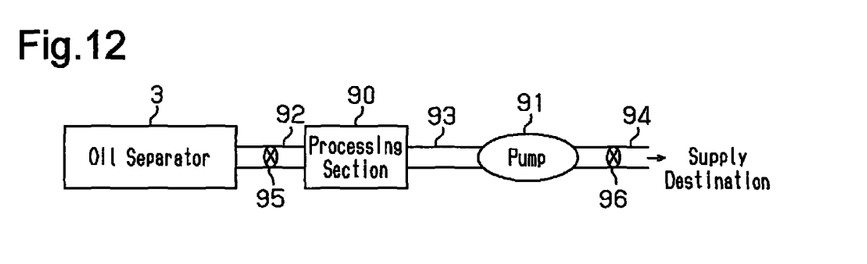
FIG. 12 is a block diagram showing an oil separator equipped with a processing section.
Figure 13:
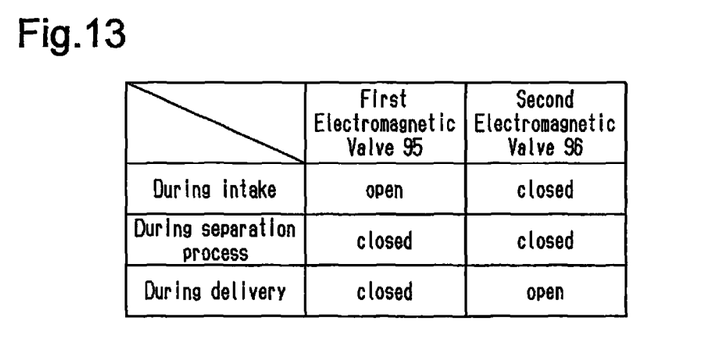
FIG. 13 is a chart showing operation of electromagnetic valves.
Figure 14:
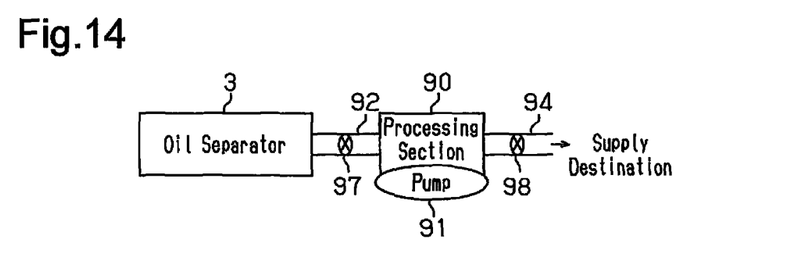
FIG. 14 is a block diagram showing an oil separator equipped with a processing section.
Figure 15:
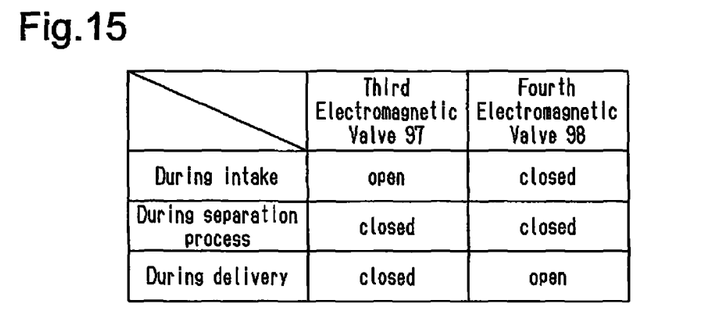
FIG. 15 is a chart showing operation of electromagnetic valves.

In the above illustrated embodiment, water contained in the collected liquid is evaporated in the collected liquid storage portions 45, 154 of the oil separator 3. However, if it takes time to separate oil and water in the collected liquid, a processing portion may be provided elsewhere to separate oil and water from the collected liquid, and the separated oil may be supplied to a supply destination such as the oil pan 7. For example, a processing portion 90 may be provided in the vicinity of the oil separator 3 as shown in FIG. 12. The oil separator 3 and the processing portion 90 are connected to each other by a first connecting pipe 92, in which a first electromagnetic valve 95 is provided. A pump 91 is provided on the downstream side of the processing portion 90. The processing portion 90 and the pump 91 are connected to each other by a second connecting pipe 93. The pump 91 and the supply destination are connected to each other by a third connecting pipe 94. A second electromagnetic valve 96 is provided in the third connecting pipe 94. As shown in FIG. 13, the first electromagnetic valve 95 is open and the second electromagnetic valve 96 is closed when taking in collected liquid from the oil separator 3. When the processing portion 90 performs a separation process, the first electromagnetic valve 95 is closed and the second electromagnetic valve 96 is closed. When delivering the separated oil to the supply destination, the first electromagnetic valve 95 is closed and the second electromagnetic valve 96 is open. Alternatively, the pump 91 may be attached to the processing portion 90 as shown in FIG. 14. The oil separator 3 and the processing portion 90 are connected to each other by a first connecting pipe 92, in which a third electromagnetic valve 97 is provided. The processing portion 90 and the supply destination are connected to each other by a third connecting pipe 94, in which a fourth electromagnetic valve 98 is provided. As shown in FIG. 15, the third electromagnetic valve 97 is open and the fourth electromagnetic valve 98 is closed when the pump 91 takes in collected liquid from the oil separator 3. When the processing portion 90 performs a separation process, the third electromagnetic valve 97 is closed and the fourth electromagnetic valve 98 is closed. When the pump 91 delivers the separated oil to the supply destination, the third electromagnetic valve 97 is closed and the fourth electromagnetic valve 98 is open.

An oil condition monitoring sensor, which is, for example, an optical sensor, a color sensor, a gas sensor, a water sensor, may be used. The oil condition monitoring sensor is used to determine whether removal of water from the oil separated from the collected liquid has been completed. When separating oil from collected liquid, it is desirable to remove contamination as well as water.

DESCRIPTION OF THE REFERENCE NUMERALS

1 . . . Compressor, 2 . . . Air Dryer, 3 . . . Oil Separator, 4 . . . Pump, 5 . . . Check Valve, 6 . . . Engine, 7 . . . Oil Pan, 3a, 7a . . . Oil Measuring Instrument, 8 . . . IG Switch, 10 . . . Oil Control Section, 11 . . . Housing, 12 . . . Front Side, 13 . . . Rear Side, 14 . . . Inlet, 15 . . . Introduction Portion, 16 . . . Outlet, 17 . . . Drain Outlet, 18 . . . Opening, 19 . . . Lid, 21 . . . Bolt, 23 . . . Accommodation Portion, 24 . . . Insertion Portion, 25 . . . Mounting Hole, 26 . . . Heater, 27 . . . Thermostat, 30 . . . Partition Wall, 30a . . . Orifice Hole, 31 . . . Primary Expansion Chamber, 32 . . . Secondary Expansion Chamber, 33 . . . Urethane Foam Block, 40 . . . Bottom Face, 41 . . . Support Column, 42 . . . Step, 43 . . . Liquid Communication Plate, 44 . . . Liquid Communication Hole, 45 . . . Collected Liquid Storage Portion, 46 . . . Baffle Plate, 50 . . . Hose, 51 . . . Mounting Member, 53 . . . Restricting. Plate, 59 . . . Third Expansion Chamber, 60 . . . Elbow Member, 70 . . . Pneumatic Pump, 71 . . . Case, 72 . . . Plunger, 73 . . . Urging Spring, 74 . . . Purge Air Supply Port, 75 . . . Intake Port 75, 76 . . . Delivery Port, 77 . . . Check Valve, 80 . . . Blow-By Gas Reducing Device, 81 . . . Rocker Cover, 82 . . . Intake Manifold, 83 . . . Air Duct, 84 . . . Connecting Pipe, 90 . . . Processing Portion, 91 . . . Pump, 92 . . . First Connecting Pipe, 93 . . . Second Connecting Pipe, 94 . . . Third Connecting Pipe, 95 . . . First Electromagnetic Valve, 96 . . . Second Electromagnetic Valve, 97 . . . Third Electromagnetic Valve, 98 . . . Fourth Electromagnetic Valve, 131 . . . Case, 131a . . . Bottom Portion, 131b . . . Flange Portion, 132 . . . Lid, 132a . . . Communication Section, 132b . . . Flange Portion, 132c . . . Through Hole, 133 . . . Drain Outlet, 134 . . . Drain Hose, 135 . . . Inlet, 136 . . . Bolt, 137 . . . Mounting Member, 138 . . . Chassis, 139 . . . Bolt, 140 . . . Outlet, 141 . . . Connecting Member, 142 . . . Discharge Hose, 145 . . . First Expansion Chamber, 146 . . . Baffle Plate, 147 . . . Cover, 147a . . . Flange Portion, 147b . . . Through Hole, 147c . . . Communication Hole, 148 . . . Accommodation Member, 48a . . . Flange Portion, 148b . . . Flange Portion, 148c . . . Through Hole, 149 . . . Upper Base, 149a . . . Through Hole, 150 . . . Urethane Foam Block, 151 . . . Second Expansion Chamber, 152 . . . Support Lid, 152a . . . Through Hole, 153 . . . Screw, 154 . . . Collected Liquid Storage Portion, 159 . . . Third Expansion Chamber.

The invention claimed is:

1. A system, comprising:
a compressor configured to compress air;
an air dryer configured to dry the compressed air and supply the dried compressed air; and
an oil separator comprising:
a housing and an impingement member located in the housing, wherein
the oil separator is configured to introduce air compressed by the compressor into the housing and cause the introduced compressed air to strike the impingement member to separate oil from the introduced compressed air, thereby recovering the oil, and
is configured to selectively supply the oil separated from the introduced compressed air to an oil pan of an engine to be used as lubricant for the engine.

2. The system according to claim 1, wherein
the oil pan is located on a circulation path of the lubricant for the engine, and
the separated oil is supplied to the oil pan via the circulation path.

3. The system according to claim 1, further comprising a pump that supplies the separated oil to the oil pan.

4. The system according to claim 1, wherein the oil separator is further configured to supply separated oil to the oil pan when the engine is not running.

5. The system according to claim 1, wherein the oil separator is further configured to supply separated oil to the oil pan when the amount of the separated oil in the oil separator reaches a predetermined amount.

6. The system according to claim 1, wherein the oil separator is further configured to stop the supply of the separated oil to the oil pan when the amount of the lubricant in the oil pan reaches an upper limit amount.

7. A system, comprising:
a compressor configured to compress air;
an air dryer configured to dry the compressed air and supply the dried compressed air; and
an oil separator comprising:
a housing;
an impingement member located in the housing; and
an oil controller;
wherein the oil separator is configured to introduce air compressed by the compressor into the housing and cause the introduced compressed air to strike the impingement member to separate oil from the introduced compressed air, thereby recovering the oil, and
the oil controller is configured to sense an amount of separated oil in the oil separator and to selectively cause the separated oil in the oil separator to be supplied to an oil pan of an engine to be used as lubricant for the engine based on the sensed amount of separated oil in the oil separator.

8. The system according to claim 7, wherein
the oil pan is located on a circulation path of the lubricant for the engine, and
the separated oil is supplied to the oil pan via the circulation path.

9. The system according to claim 7, further comprising a pump controlled by the oil controller and that supplies the separated oil to the oil pan.

10. The system according to claim 7, wherein the oil controller is further configured to sense whether the engine is running or not running and to selectively cause the separated oil in the oil separator to be supplied to the oil pan when the engine is not running.

11. The system according to claim 7, wherein the oil controller is further configured to sense an amount of oil in the oil pan and to selectively cause the separated oil in the oil separator to be supplied to the oil pan when the amount of the oil in the oil pan is less than an upper limit amount.

12. The system according to claim 7, wherein the oil controller is further configured to sense an amount of oil in the oil pan and to selectively cause the supply of the separated oil to the oil pan to be stopped when the amount of the oil in the oil pan reaches an upper limit amount.

13. The system according to claim 10, wherein the oil controller is further configured to sense an amount of oil in the oil pan and to selectively cause the separated oil in the oil separator to be supplied to the oil pan when the amount of the separated oil in the oil pan is less than an upper limit amount.

14. The system according to claim 10, wherein the oil controller is further configured to sense an amount of oil in the oil pan and to selectively cause the supply of the separated oil to the oil pan to be stopped when the amount of the oil in the oil pan reaches an upper limit amount.

* * * * *